Oct. 7, 1958   A. P. DOUGLAS ET AL   2,855,220
BICYCLE FRAME STRUCTURE
Filed June 20, 1957   2 Sheets-Sheet 1
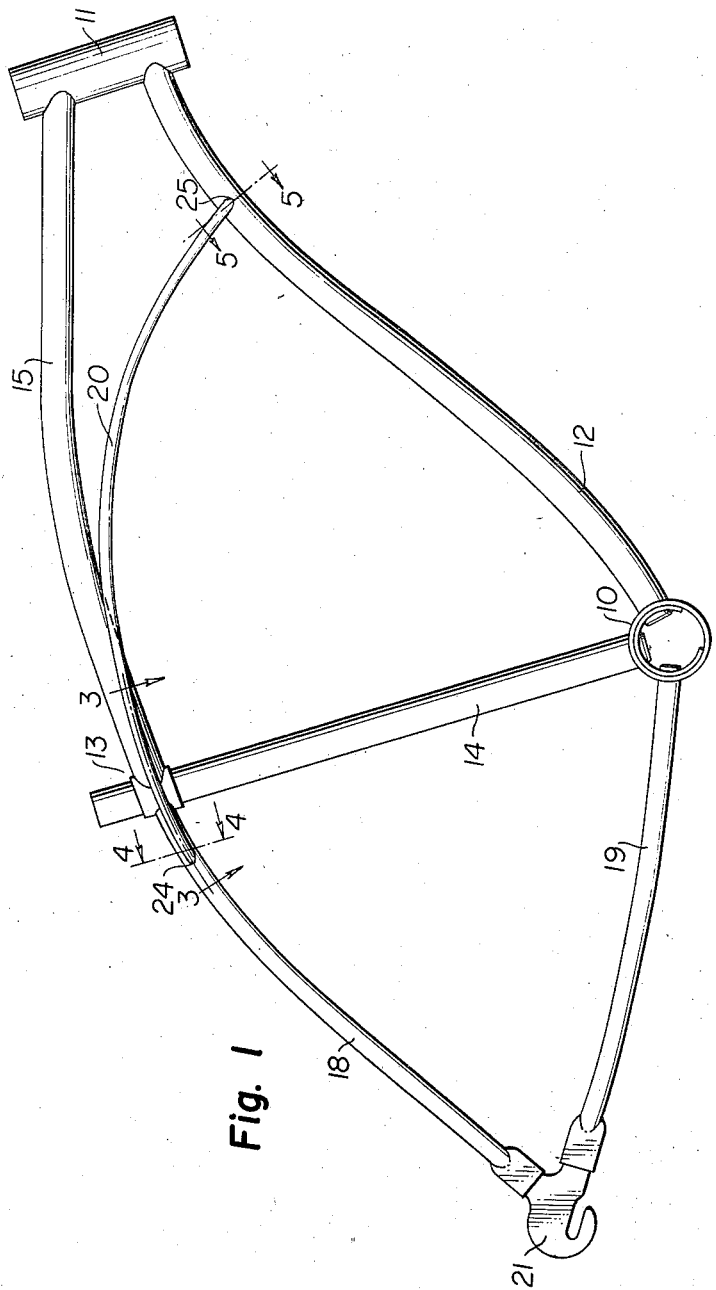
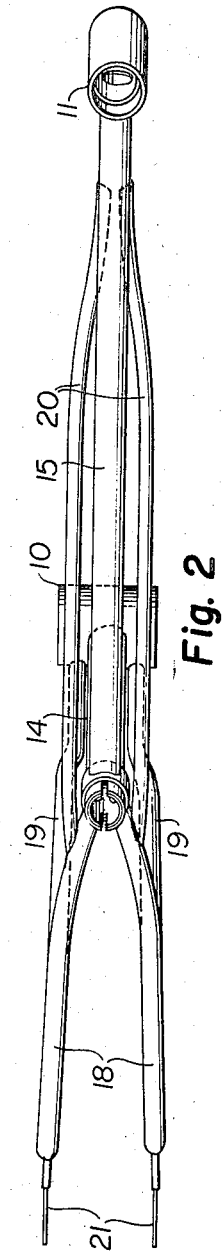
INVENTORS
ALVIN P. DOUGLAS
BY GILBERT B. HAHN
*Gobrick & Gobrick*
ATTORNEYS Oct. 7, 1958

A. P. DOUGLAS ET AL 2,855,220

BICYCLE FRAME STRUCTURE

Filed June 20, 1957

INVENTORS
ALVIN P. DOUGLAS
BY GILBERT B. HAHN
Gobrick & Gobrick
ATTORNEYS

United States Patent Office 2,855,220
Patented Oct. 7, 1958

2,855,220

BICYCLE FRAME STRUCTURE

Alvin P. Douglas, Cleveland Heights, and Gilbert B. Hahn, Lyndhurst, Ohio, assignors to The Murray Ohio Manufacturing Company, Cleveland, Ohio, a corporation of Ohio Application June 20, 1957, Serial No. 666,883

1 Claim. (Cl. 280—281)

This invention is directed to improvements in tubular bicycle frames and has for its general object the provision of improvements in boy's type bicycle frames.

A specific object of the invention is the provision of a novel manner of frame construction having outrigger strut tubes securely connected to the lower front reach tube and to the rear upper fork tubes at the rear of the seat post cluster structure without involving the seat post cluster structure.

A further object is the provision of a frame structure having outrigger tubes connecting the upper regions of the upper rear fork tubes to the lower front reach tube, the connections between the tubes being such as to assure rigidity in the forepart of the frame.

Other objects of the invention will become apparent to those skilled in the art from the following description referring to the accompanying drawings showing a preferred embodiment. The essential characteristics are summarized in the claim.

In the drawings:

Fig. 1 shows an elevational view of a boy's bicycle frame incorporating the invention;

Fig. 2 is a plane view of the frame shown in Fig. 1;

The present invention contemplates the use of outrigger tubes on a boy's type bicycle frame shaped and disposed to extend between the lower front reach bar and the upper region of the upper rear fork tubes the connections being such that external jointures on the fork tubes and the lower front reach bar may be effected without involving penetration of the said fork tubes and reach tube while affording a resistance weld and a brazing weld of the outrigger tubes to the frame.

Figure 3:
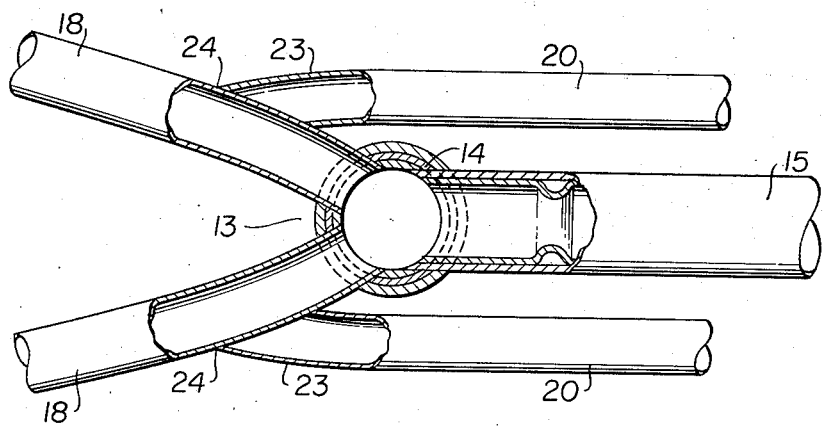
Fig. 3 is a cross sectional view taken along a substantially horizontal plane indicated by the line 3—3 in Fig. 1.
Figure 4:
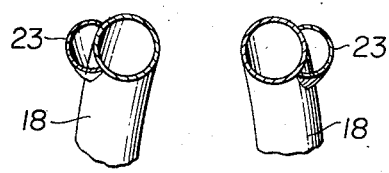
Fig. 4 is a cross-sectional view taken through the upper jointure of the outrigger tubes to the upper rear fork tubes.

In Fig. 1 is shown a conventional frame comprising a hanger housing tube 10 and a head or fork bearing tube 11 connected by a lower front reach tube 12. The hanger tube 10 and the head tube 11 are connected respectively to a seat post cluster structure, generally indicated by reference numeral 13, by mast tube 14 and upper front reach tube 15. The rear upper fork members 18 are individually connected into the seat post cluster structure 13 more clearly understood by referring to the cross sectional view in Fig. 4.

The particular frame above described including lower rear fork tubes 19 and rear axle clips 21 are press fitted together and all of the joints are copper brazed simultaneously in a reduction furnace such as a hydrogen furnace and it is in such a production environment that it is desired to apply outrigger tubes 20 to the frame.

Figure 5:
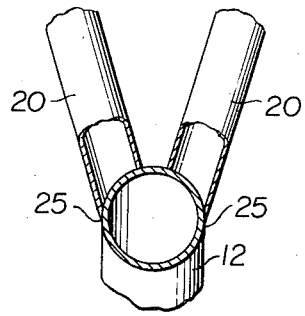
Fig. 5 is a cross sectional view of the jointure of the outrigger tubes and the lower front reach tube indicated by the line 5—5 in Fig. 1.

The outrigger tubes 20 are shaped at the upper portions 23 thereof to curve inwardly toward each other around the back of and spaced from the seat post cluster structure 13 with the ends thereof concavely formed to fit the outside surfaces of the upper rear forks 18. This shaping also includes the formation of spot welding pads 24 formed on the ends of the tubes 20 disposed on the outside faces of the tubes. In like manner spot welding pads 25 are formed on the opposite concavely cut ends of the tubes 20 as shown in Fig. 5 to be disposed outwardly.

After the main frame has been press fit assembled, the outrigger tubes 20 are affixed to the frame as shown by holding the frame and tubes 20 in a spot welding fixture. The spot welds 24 at the tops of the tubes 20 are first effected and the lower ends of the tubes 20 are brought into contact with the lower front reach tube and the spot welds 25 are then effected. The joints thus effected are completed by the use of copper wire or copper brazing paste at the time the assembled frame is passed through the brazing furnace. The tubes 20, it will be noted, are out of contact with the seat post cluster and form a strut directly between the rear upper fork tubes and the lower front reach bar 12.

We have found that the brazed band between the ends of the outrigger tubes 20 to the outer surfaces of the frame tubes 12 and 18 are dependable in production as to uniformity of bonding and the rigidity of the forepart of the frame is increased while avoiding the necessity of adding elements to the seat post cluster structure.

We claim:

In a bicycle frame construction including a single seat post mast tube extending upwardly from a hanger housing, a single lower front reach tube extending between the hanger housing and the head tube of the frame, a single upper front reach tube extending between a seat post cluster structure on the mast tube and the head tube of the frame, and a pair of upper rear fork tubes extending rearwardly and downwardly from the seat post cluster structure: the combination with the frame of a pair of outrigger tubes one on each side of the upper front reach tube and joined to the front lower reach tube adjacent the head tube of the frame, said outrigger tubes extending rearwardly past the seat post cluster structure out of contact therewith and converging inwardly around the back of the seat post cluster structure into contact with the sides of the upper end portions of the rear upper fork tubes and terminating in individual connections to the rear upper fork tubes at the rear of the mast tube, said outrigger tubes having the rear ends thereof concavely formed to abuttingly fit the side portions of the upper rear fork tubes and spot welded to the upper rear fork tubes at the rear tips of the outrigger tubes and the forward ends of the outrigger tubes converging inwardly toward each other into contact with the front lower reach tube with the forward ends thereof shaped to individually fit the top and side of the front lower reach tube with provision for a spot weld at the side of the lower front reach tube.

References Cited in the file of this patent

UNITED STATES PATENTS

| | | |
|---|---|---|
| 623,495 | Trebert | Apr. 18, 1899 |
| 2,151,533 | Schwinn | Mar. 21, 1939 |
| 2,443,008 | Kraeft et al. | June 8, 1948 |
| 2,491,379 | Kraeft et al. | Dec. 13, 1949 |